US009946881B2

United States Patent
Thom et al.

(10) Patent No.: US 9,946,881 B2
(45) Date of Patent: *Apr. 17, 2018

(54) GLOBAL PLATFORM HEALTH MANAGEMENT

(71) Applicant: Microsoft Technology Licensing, LLC, Redmond, WA (US)

(72) Inventors: Stefan Thom, Snohomish, WA (US); Ronald Aigner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,005

(22) Filed: Jan. 17, 2017

(65) Prior Publication Data
US 2017/0124334 A1 May 4, 2017

Related U.S. Application Data

(63) Continuation of application No. 14/884,951, filed on Oct. 16, 2015, now Pat. No. 9,576,134, which is a
(Continued)

(51) Int. Cl.
*H04L 29/06* (2006.01)
*G06F 21/57* (2013.01)

(52) U.S. Cl.
CPC .......... *G06F 21/577* (2013.01); *G06F 21/575* (2013.01); *G06F 2221/034* (2013.01)

(58) Field of Classification Search
CPC ............................. G06F 21/577; G06F 21/575
(Continued)

(56) References Cited

U.S. PATENT DOCUMENTS 6,501,469 B1 * 12/2002 MacPhail ............ G06F 3/04815
345/419
7,587,523 B2 * 9/2009 Miller ....................... H04L 1/22
710/107
(Continued)

FOREIGN PATENT DOCUMENTS

CN 201741156 U 2/2011
CN 102063591 A 5/2011
(Continued)

OTHER PUBLICATIONS

"How to Use TPM: A Guide to Hardware-Based Endpoint Security", Trusted Computer Group, 2009, 2 pages.
(Continued)

*Primary Examiner* — Michael S McNally
(74) *Attorney, Agent, or Firm* — Workman Nydegger

(57) ABSTRACT

The use of one or more device health values to indicate the health status of a computing device may enable operating system developers to directly manage the security configuration of the computing device. For instance, a device health value is generated based on a state of the hardware component and/or a state of a software stack that includes the operating system at boot up. The device health value may be compared to a reference health value to determine whether the computing device is in a secured state. Based on the device health value not matching the reference health value, it is determined that the computing device is operating in an unexpected state. Also, a recovery environment may be implemented on the computing device in order to fix any errors with the computing device.

20 Claims, 8 Drawing Sheets

Related U.S. Application Data continuation of application No. 13/968,205, filed on Aug. 15, 2013, now Pat. No. 9,167,002.

(58) Field of Classification Search
USPC .......................................................... 726/25
See application file for complete search history.

(56) References Cited

U.S. PATENT DOCUMENTS

| | | | |
|---|---|---|---|
| 7,886,335 B1* | 2/2011 | Chickering | H04L 43/0817 726/1 |
| 8,127,146 B2 | 2/2012 | Thom et al. | |
| 8,255,902 B1 | 8/2012 | Satish | |
| 8,375,221 B1 | 2/2013 | Thom et al. | |
| 8,458,462 B1* | 6/2013 | Hanna | H04L 63/10 713/156 |
| 8,505,103 B2 | 8/2013 | Song et al. | |
| 8,886,335 B2 | 11/2014 | Pianca et al. | |
| 2004/0064457 A1* | 4/2004 | Zimmer | G06F 21/575 |
| 2005/0120219 A1* | 6/2005 | Munetoh | G06F 21/52 713/176 |
| 2005/0234846 A1* | 10/2005 | Davidson | G06F 9/4416 |
| 2006/0242406 A1 | 10/2006 | Barde et al. | |
| 2007/0143629 A1* | 6/2007 | Hardjono | H04L 63/0823 713/189 |
| 2008/0126779 A1 | 5/2008 | Smith | |
| 2008/0235754 A1 | 9/2008 | Wiseman et al. | |
| 2008/0288783 A1* | 11/2008 | Jansen | G06F 21/57 713/189 |
| 2009/0025068 A1* | 1/2009 | Benameur | G06F 21/6227 726/5 |
| 2009/0041252 A1* | 2/2009 | Hanna | H04L 63/12 380/278 |
| 2009/0158036 A1 | 6/2009 | Barde et al. | |
| 2011/0307711 A1 | 12/2011 | Novak et al. | |
| 2012/0226895 A1 | 9/2012 | Anderson et al. | |
| 2015/0052610 A1 | 2/2015 | Thom et al. | |
| 2016/0034691 A1 | 2/2016 | Thom et al. | |

FOREIGN PATENT DOCUMENTS

| | | |
|---|---|---|
| CN | 102682235 A | 9/2012 |
| CN | 102693379 A | 9/2012 |
| WO | 2007115116 A2 | 10/2007 |

OTHER PUBLICATIONS

Munetoh, et al., "Integrity Management Infrastructure for Trusted Computing", In IEICE Transactions on Information and Systems, Information & Systems Society, vol. E91D, Issue 05, May 1, 2008, 2 Pages.

Office action for U.S. Appl. No. 13/968,205, dated Nov. 14, 2014, Thom et al., "Global Platform Health Management", 7 pages.

Office action for U.S. Appl. No. 13/968,205, dated Mar. 10, 2015, Thom et al., "Global Platform Health Management", 6 pages.

Office Action for U.S. Appl. No. 14/884,951, dated Aug. 12, 2016, Stefan Thom, "Global Platform Health Management", 14 pages.

PCT Search Report dated Oct. 21, 2014 for PCT/US2014/050827, 5 pages.

"Securing the Windows 8 Boot Process", Published Date: Apr. 7, 2013, Available at: https://web.archive.org/web/20130407043239/ http://technet.microsoft.com/en-us/windows/dn168167.aspx?, 4 pages.

TCG Infrastructure Working Group Architecture Part II—Integrity Management, In Trusted Computing Group, Nov. 17, 2006, 67 pages.

TCG Specification Architecture Overview, Published Date: Apr. 28, 2004, Available at: http://www.trustedcomputinggroup.org/files/ resource_files/AC652DE1-1D09-3519-ADA026A0C05CFAC2/ TCF_1_4_Architecture_Overview.pdf, pp. 1-54.

"Protection Profile PC Client Specific Trusted Platform Module TPM Family 1.2; Level 2 Revisino 116", Trusted Computing Group, Specification Version 1.2, May 2011, 133 pages.

TCG, "TPM Main Part 1 Design Principles", Trusted Computing Group Incorporated, Specification Version 1.2, Revision 116, Mar. 2011, 184 pages.

TCG, "TPM Main Part 2 TPM Structures", Trusted Computing Group, Specification version 1.2, Level 2, Revision 116, Mar. 2011, 202 pages.

TCG, "TPM Main Part 3 Commands", Trusted Computing Group, Specification version 1.2, Level 2, Revision 116, Mar. 2011, 339 pages.

"Trusted Platform Modules Strengthen User and Platform Authenticity", Trusted Computing Group, Jan. 2005, 8 pages.

"Office Action Issued in European Patent Application No. 14758738.0", dated Jul. 17, 2017, 4 Pages.

"First Office Action and Search Report Issued in Chinese Patent Application No. 201480045238.4", dated Oct. 17, 2017, 11 Pages.

* cited by examiner

GLOBAL PLATFORM HEALTH MANAGEMENT

RELATED APPLICATIONS

This application claims priority to and is a continuation of U.S. patent application Ser. No. 14/884,951, filed on Oct. 16, 2015, which claims priority to and is a continuation of U.S. patent application Ser. No. 13/968,205, filed on Aug. 15, 2013, now U.S. Pat. No. 9,167,002, the entire contents of which are incorporated herein by reference.

BACKGROUND

Typically, a computing device makes use of a security module to monitor the hardware platform and the operating system of the computing device during boot up. The security module is often a dedicated processing chip that receives state inputs from various components of the computing device as the computing device boots up. In turn, the security module provides the state inputs to applications on the computing device. The applications generally use the state inputs to verify that the computing device is a secured platform for the execution of the applications, e.g., the operating system is up-to-date and free from known security problems.

However, in many instances, the security module receives a large number of inputs from the hardware and software platform during boot up due to the large number of hardware components that are initialized. Furthermore, many applications are incapable of processing the state inputs that are received from the security module. The development of applications that are capable of processing state inputs from a plethora of computing devices with various hardware configurations to distinguish between secure and compromised computing devices typically call for a significant outlay of resources. Often, application developers lack or are otherwise unwilling to commit such resources. As such, while the security module is intended to assist in creating a secured computing platform, the state inputs that are provided by the security module are often ignored by a large number of applications on the computing device.

Accordingly, applications executing on the computing device despite the fact that the state inputs are reflective of a compromised computing device. The execution of such applications often inadvertently allows a malicious party to take control of the computing device and/or steal user data from the computing device.

SUMMARY

Described herein are techniques for using one or more device health values that are derived by a trust module on a computing device to determine the health status of the computing device. The techniques may generate one or more reference health values for the computing device. The one or more reference health values may be generated in advance using one or more reference computing devices that have identical hardware and/or software configurations as the computing device. The reference health values may represent a state of the hardware platform and/or a state of a software stack that includes the operating system of the reference computing device at the boot up of the reference computing device. The reference health values may reflect the fact that the hardware platform and/or the operating system of the reference computing device are known to be in a secured state. A computing device in the secured state may be free from known security problems. In some embodiments, the state of the hardware platform may be measured with respect to invariant hardware components of the hardware platform that affect the security context of the computing device (e.g., graphics processor, flash memory, etc.), as opposed to peripheral hardware components (e.g., external keyboard, mouse, docking station, etc.).

The trust module on the computing device may generate one or more device health values that represent the state of the hardware platform and/or a state of the operating system of the computing device at boot up. A boot process component on the computing device may determine that the computing device is in a secured state when each device health value matches a corresponding reference health value. Conversely, the component may determine that the computing device is in an unexpected state when any device health value and its corresponding reference health value are different. In the event that the computing device is found to be in an unexpected state, the boot process component may initiate a fix of the software components on the computing device by executing a recovery environment, such as a parallel safe software stack that includes a maintenance module. For example, the recovery environment may initiate a repair of a corrupt data file, a removal of malware or virus, a reimaging of the operating system, installation of new firmware for one or more hardware components, and so forth, such that the computing device may be brought back into a secured state.

In contrast, the computing device operating in a secured state may execute a multitude of applications. For example, the computing device may use a corresponding health certificate to certify its secured status to another entity. In turn, the entity may provide a requested service to the computing device after accepting the health certificate. In another example, the computing device may use one or more keys that are distributed to the computing device and bound to the one or more reference health values to perform tasks, such as regulating access to the user data stored on the computing device. The one or more keys may uniquely identify the computing device. In some instances, mechanisms on the computing device may provide the one or more keys assigned to the computing device with an expiration date to ensure that full access to the computing device is contingent upon the computing device being periodically updated with the latest patches and software updates.

In at least one embodiment, the generation of one or more device health values involves initializing hardware components of a computing device and loading the operating system according to configuration settings during boot up of the computing device. One or more device health values are then generated based on a state of the hardware component and/or a state of a software stack that includes the operating system at boot up. A device health value may be compared to a corresponding reference health value to determine whether the computing device is in a secured state.

Accordingly, the techniques may enable operating system developers to directly manage the configuration of the computing device as a secured computing platform. In this way, the user may be freed from the tasks of monitoring the health of the computing device, ensuring that the latest updates and patches are installed, and verifying that the operating system is in a maintained state. While in the maintained state, the operating system may be free from known malware, virus, and other malicious code. Instead, the user may be assured that from the time of booting up, the computing device is in a secured state, and that the user is able to trust the computing device to keep confidential user data secure.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Described herein are techniques for using one or more device health values that are derived by a trust module on a computing device to determine the health status of the computing device. The techniques may generate one or more reference health values for the computing device. The one or more reference health values may be generated in advance using a reference computing device that has identical hardware and/or software configurations as the computing device. The one or more reference health values may represent a state of the hardware platform and/or a state of a software stack that includes the operating system of the reference computing device at the boot up of the reference computing device, in which the hardware platform and the operating system of the reference computing device are known to be free from known security problems.

The trust module on the computing device may generate one or more device health values that represent the state of the hardware platform and/or a state of a software stack that includes the operating system of the computing device at boot up. A boot process component on the computing device may compare each device health value to a corresponding reference health value to determine whether the computing device is in a secured state or an unexpected state. The unexpected state may be an indication that the computing device is compromised in some way. In the event that the computing device is found to be in an unexpected state, the boot process component initiate a fix of the software components on the computing device by executing a recovery environment. In contrast, the computing device operating in a secured state may execute a multitude of applications. For example, the computing device may use one or more keys that are distributed to the computing device and bound to the one or more reference health values to perform tasks, such as regulating access to the user data stored on the computing device.

In some instances, mechanisms on the computing device may provide the one or more keys distributed to the computing device with an expiration date to ensure that full access to the computing device is contingent upon the computing device being updated periodically with the latest patches and software updates. Examples of techniques for using a device health value that is derived by a trust module on a computing device to determine the health status of the computing device in accordance with various embodiments are described below with reference to FIGS. 1-8.

Example Scheme

Figure 1:
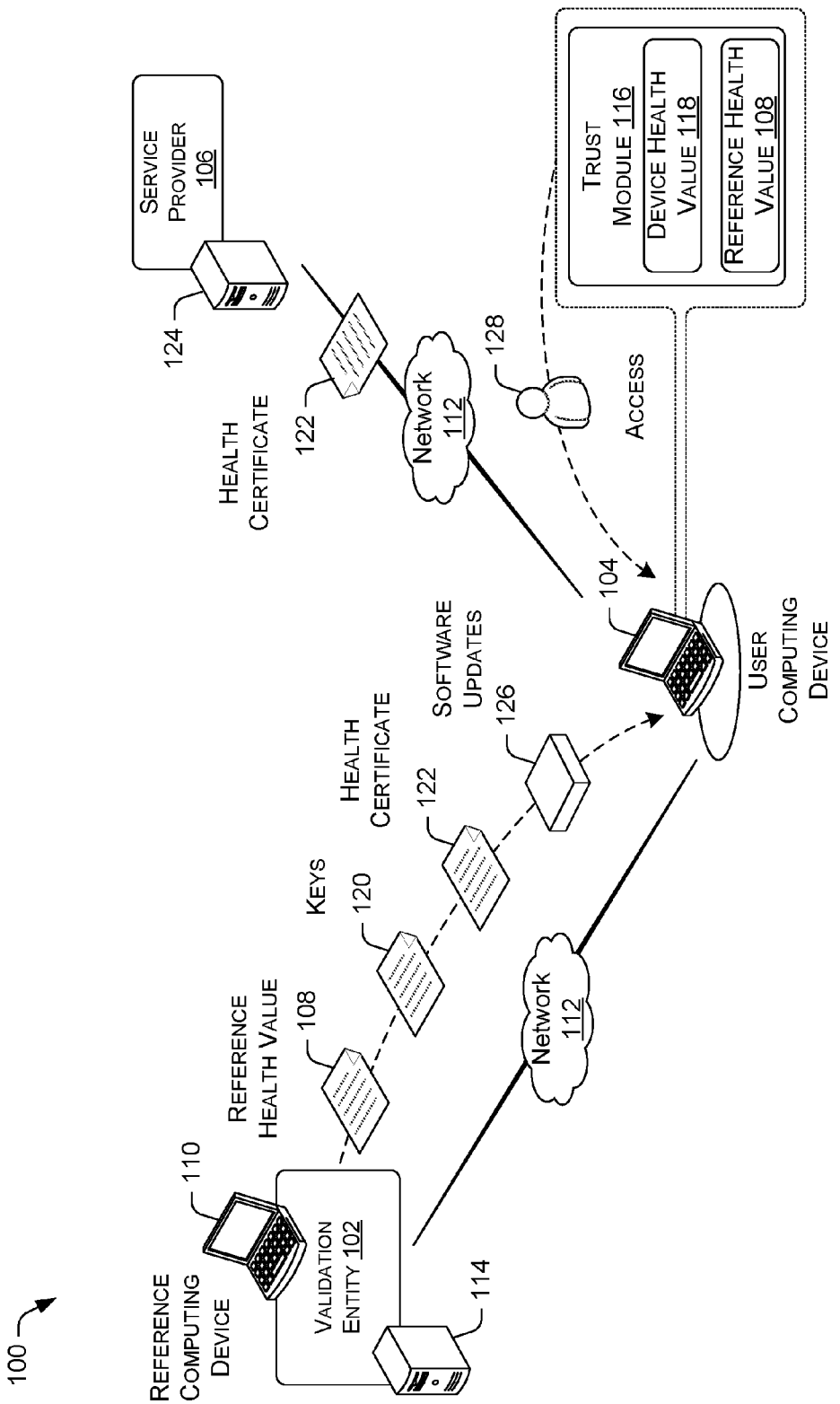
FIG. 1 is a block diagram that illustrates an example scheme for assessing a health status of a user computing device, in which the assessed health status is used to authorize access to the user computing device and/or to obtain services from service providers.

FIG. 1 is a block diagram that illustrates an example scheme for assessing a health status of a user computing device, in which the assess health status is used to authorize access to the user computing device and obtain services from service providers. The example scheme 100 may include a validation entity 102, a user computing device 104, and a service provider 106. The validation entity 102 may be an operating system developer, a hardware platform manufacturer, e.g., an original equipment manufacturer (OEM), or a third party trusted by both the operating system developer and the hardware platform manufacturer.

The validation entity 102 may be responsible for generating a reference health value 108 for the user computing device 104. The validation entity 102 may use a reference computing device 110 that has identical hardware and software configurations as the user computing device 104 to generate the reference health value 108. For example, the reference computing device 110 may have the same hardware components as the user computing device 104, in which the hardware components are set up to work in an identical manner. Further, the reference computing device 110 may be executing the same operating system according to the same configuration settings as the user computing device 104.

The reference health value 108 may represent a state of the hardware platform and/or a state of a software stack that includes the operating system of the reference computing device 110 at the boot up of the reference computing device, in which the hardware platform and the operating system of the reference computing device are known to be in a maintained state that is free from known security problems. In some embodiments, a health value module on the reference computing device 110 may generate the reference health value 108. The health value module may be stand-alone processor that collects measurements related to a hardware platform of the reference computing device 110 and a state of software stack executing on the hardware platform at boot up. The measurements are converted by the health value module of the reference computing device 110 into the reference health value. However, in other embodiments, the health value module may be implemented as software running a protected environment, i.e., executed by one or more processors of the reference computing device 110 from the protected system memory of the reference computing device 110.

In some embodiments, the measurements for the hardware platform of the reference computing device 110 may be made with respect to invariant hardware components that affect the security context of the computing device (e.g., graphics processor, flash memory, etc.), as opposed to peripheral hardware components (e.g., external keyboard, mouse, docking station, etc.). In this way, the reference health value is not affected by the attachment or removal of such secondary hardware components with respect to the reference computing device 110.

The validation entity 102 may provide the reference health value 108 to the user computing device 104 via the network 112. For example, a server 114 operated by the validation entity 102 may transmit the reference health value 108 to the user computing device 104. In various embodiments, the network 112 may be a local area network ("LAN"), a larger network such as a wide area network ("WAN"), and/or a collection of networks, such as the Internet. Protocols for network communication, such as TCP/IP, may be used to implement the network 112. The network 112 may be implemented using various wireless communication interface technology (e.g., cellular, Wi-Fi, Ultrawideband, Bluetooth, satellite transmissions), and/or the like. Alternatively or concurrently, the network 112 may also be implemented using various wired communication technology, such as LAN Ethernet, WAN Ethernet, a universal serial bus (USB), a high speed serial bus, and/or the like.

The user computing device 104 may use a trust module 116 to generate a device health value 118. In various embodiments, the trust module 116 may be a standalone processor that is installed on the user computing device 104 to facilitate platform security. For example, the trust module 116 may be similar to a trusted platform module (TPM) module that conforms to the TPM specifications outline by the Trusted Computing Group (TCG). However, in other embodiments, the trust module 116 may be implemented as software running a protected environment, i.e., executed by one or more processors of the user computing device 104 from the protected system memory of the user computing device 104.

The trust module 116 may obtain measurements related to a state of a hardware platform of the user computing device 104 and a state of a software stack that includes the operating system executing on the hardware platform at boot up of the user computing device 104. The trust module 116 may generate the device health value 118 based on these measurements. A boot process component may determine that the user computing device 104 is in a secured state when the device health value 118 matches the reference health value 108. Conversely, the boot process component may determine that the user computing device 104 is in an unexpected state when the device health value 118 and the reference health value 108 are different. The unexpected state may be an indication that the computing device is compromised in some way. In the event that the user computing device 104 is found to be in an unexpected state, the boot process component may initiate a fix of the software components on the computing device. For example, the boot process component may execute a recovery environment to initiate a repair of a corrupt data file, a removal of a malware, a reimaging of the operating system, and so forth, such that the user computing device 104 may be brought back into a secured state. In at least one embodiment, the recovery environment may be a parallel safe software stack that includes a maintenance module. In contrast, the user computing device 104 operating in a secured state may be permitted by the trust module 116 execute a multitude of applications that perform tasks.

For example, as long as the user computing device 104 is in the secured state, the user computing device 104 may use one or more keys 120 that are distributed to the user computing device 104 to protect data files on the user computing device 104. In various embodiments, the one or more keys 120 may be cryptographic keys. The validation entity 102 may distribute the one or more keys 120 to the user computing device 104 along with the reference health value 108. In some instances, the one or more keys 120 may uniquely identify the user computing device 104. The trust module 116 may generate an access secret based on a combination of the one or more keys 120 and the reference health value 108. The trust module 116 may use the access secret to protect user data that is stored on the user computing device 104. Accordingly, the user data on the computing device may only be accessed by applications on the user computing device 104 when the one or more keys 120 are valid and the device health value 118 obtained by the trust module 116 at boot up matches the stored reference health value 108.

In another example, the validation entity 102 may provide a health certificate 122 along with the reference health value 108 to the user computing device 104. The health certificate 122 may be used by the user computing device 104 to certify its secured status to service providers, such as the service provider 106. In turn, the service provider 106 may provide services to the user computing device 104 via one or more servers 124. For instance, a service provider may accept a payment that is initiated at the user computing device 104, transmit a data file to the user computing device 104, or open a secured communication channel with the user computing device 104. In some embodiments, the health certificate 122 may include the one or more keys 120 that serve to uniquely identify the user computing device 104.

In some embodiments, the one or more keys 120 may have expiration dates. Accordingly, some services offered by the user computing device 104 may become disabled. For example, the data files that are protected using the one or more keys 120 may become inaccessible following the expiration of the one or more keys 120. The services may be restored when the user computing device 104 is updated with one or more new keys. However, the update of the one or more keys 120 to new keys may be made contingent upon the user computing device 104 accepting the software updates 126. The software updates 126 may include updates to an operating system, updates to the firmware of the one or more hardware components of the hardware platform, updates to one or more applications installed on the user computing device 104, a replacement health certificate that takes place of the health certificate 122, and so forth. In this way, the expiration of the one or more keys 120 may serve to incentivize a user 128 of the user computing device 104 to keep the device up-to-date with the latest security patches and software updates.

Example Components

Figure 2:
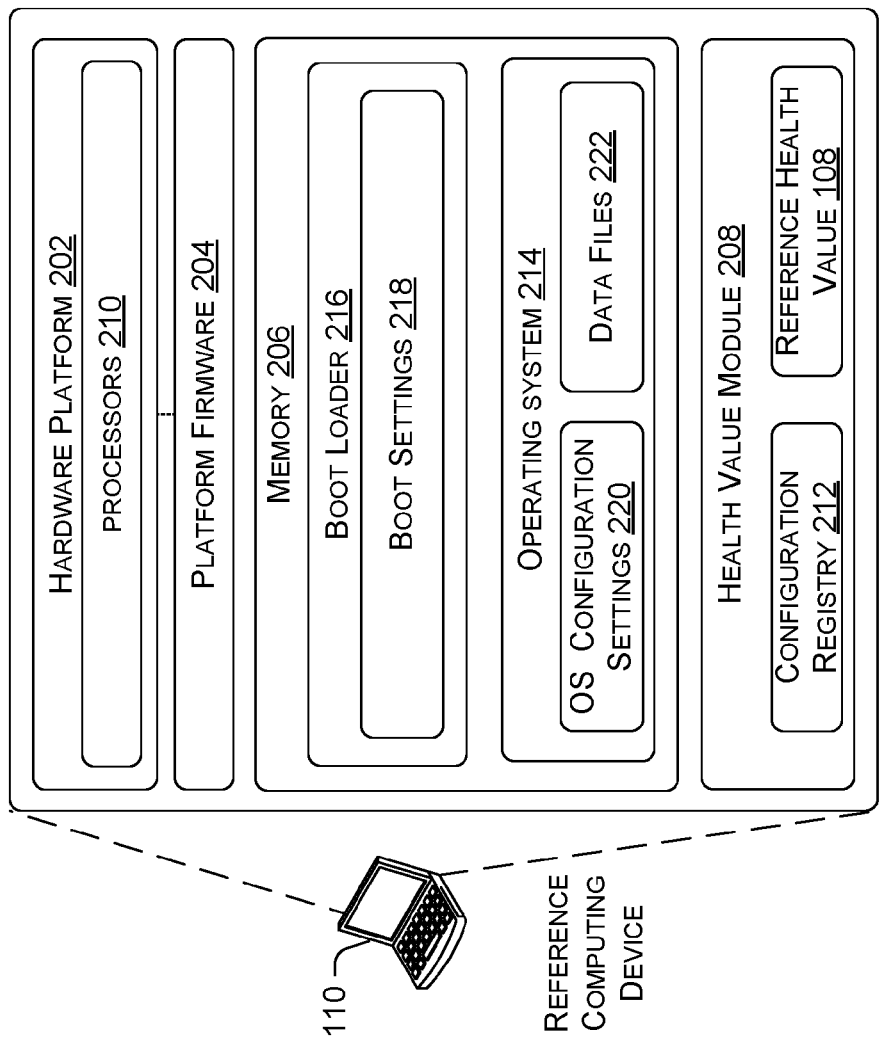
FIG. 2 is an illustrative diagram that shows example components of a reference computing device that generates a reference health value that is used to assess the health status of the user computing device.

FIG. 2 is an illustrative diagram that shows example components of a reference computing device 110 that generates a reference health value that is used to assess the health status of the computing device. In various embodiments, the reference computing device 110 may be a desktop computer, a tablet computer, a laptop computer, a smart phone, a game console, a personal digital assistant (PDA), and so forth.

The reference computing device 110 may include a hardware platform 202, platform firmware 204, memory 206, and a health value module 208. The hardware platform 202 may include one or more hardware components that enable the software on reference computing device 110 to execute applications, such as the one or more processors 210. The one or more processors 210 may include a central processing unit (CPU), a graphics processing unit (GPU), a microprocessor, a digital signal processor, and so on. Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. The described functions may be implemented as one or more hardware logic components, such as Field-Programmable Gate Arrays (FPGAs), Application-Specific Integrated Circuits (ASICs), Program-Specific Standard Products (ASSPs), System-on-a-chip systems (SOCs), Complex Programmable Logic Devices (CPLDs), etc. Other hardware components of the hardware platform may include a network interface card (NIC), a sound card, a camera, a display interface, a display, user interfaces, and so forth. Although shown separately for illustrative purposes, the memory 206 may be a part of the hardware platform 202. The platform firmware 204 may include program instructions that enable an operating system 214 to interface with the hardware components of the hardware platform 202. Accordingly, the operating system 214 may instruct the hardware components to perform tasks and/or generate data. The firmware for a hardware component may be stored in the persistent memory of the hardware component.

The memory 206 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 206 of the reference computing device 110 may store software components that include an operating system 214 and a boot loader 216. The boot loader 216 may initialize the one or more hardware components of the hardware platform 202. In various embodiments, the boot loader 216 may perform such initialization by powering up each hardware component and/or providing instructions to each hardware component through its firmware hardware component. In some embodiments, the boot loader 216 may initialize the hardware platform 202 using boot settings 218. The boot settings 218 may dictate the specific hardware components of the hardware platform 202 that are to be initialized at boot up. For example, the boot settings 218 may dictate a specific list of approved hardware components to power up. Alternatively, the boot settings 218 may dictate one or more criteria for selecting hardware components to be initialized. For example, the boot settings 218 may restrict initialization to each hardware component of the hardware platform 202 whose firmware is approved, e.g., digitally signed, by the validation entity 102. The boot settings 218 may also include specific configurations for initializing the hardware components of the hardware platform 202. For example, the configurations may dictate power levels, data transfer rates, memory allocations, and so forth, for the hardware components. The specific configurations may be configurations that are approved by the validation entity 102.

Once the hardware components are initialized, the boot loader 216 may load the operating system 214 into working memory (e.g., RAM) to instantiate a computing environment. The computing environment may support the execution of one or more applications. In some embodiments, the boot loader 216 may load the operating system 214 according to the operating system configuration settings 220. The operating system configuration settings 220 may dictate one or more data files 222 (e.g., libraries, drivers, configurations, etc.) of the operating system 214 to be loaded. The loading of the one or more data files 222 may customize the operating system 214 to perform particular services, provide specific functions, or display customized visual effects.

The health value module 208 may collect configuration values from the hardware platform 202 and/or the operating system 214 as the reference computing device 110 boots. Each configuration value for the hardware platform 202 may represent the state of a particular hardware component. Likewise, each configuration value for the operating system 214 represents a specific context of the operating system 214. The health value module 208 may be a standalone processor module that is installed on the reference computing device 110. For example, the processor module may be similar to a TPM module that conforms to the TPM specifications outline by the TCG. In some embodiments, the hardware platform 202 and/or the operating system 214 may provide the configuration values to the health value module 208 via dedicated interfaces. In some embodiments, the hardware platform 202 may be configured to provide configuration values with respect to invariant hardware components of the hardware platform 202. Such hardware component are components that affect the security context of the computing device (e.g., graphics processor, flash memory, etc.), as opposed to peripheral hardware components (e.g., external keyboard, mouse, docking station, etc.).

The health value module 208 may store the configuration values in the configuration registry 212. In some instances, the health value module 208 may discard configuration values of peripheral hardware components from the configuration registry 212. In various embodiments, the configuration registry 212 may include two registry portions. A first portion of the configuration registry 212 may store configuration values that are associated with the hardware platform 202, while a second portion may store configuration values that are associated with the operating system 214.

The health value module 208 may generate the reference health value 108 based the values that are stored in the configuration registry 212. In at least one embodiment, the health value module 208 may generate the reference health value 108 by compounding the configuration values associate with the hardware platform 202 and the operating system 214 into the reference health value 108. The health value module 208 may use one or more arithmetic operations and/or one or more data transformation operations to perform the generation, as long as the resultant reference health value 108 uniquely represents the combination of the input configuration values. The reference health value 108 may represent a computing device that is in a secured state.

In other embodiments, the health value module 208 may generate the reference health value 108 solely from the configuration values associated with the hardware platform 202 or the operating system 214. Once again, the health value module 208 may use one or more arithmetic operations and/or one or more data transformation operations to perform the compounding, as long as the resultant reference health value 108 uniquely represents the combination of the input configuration values.

Accordingly, in some instances, the health value module 208 may generate multiple reference health values for the reference computing device 110. For example, the health value module 208 may generate a first reference health value from the configuration values associated with the hardware platform 202, and generate a second reference health value from the configuration values associated with the operating system 214. Further, in other instances, the generation of the first reference health value and the second reference health value may be performed by two separate health value modules that reside on two different reference computing devices. For example, the first reference health value may be generated by a hardware manufacturer using a first reference computing device, while the second reference health value may be generated by a software developer using a second reference computing device.

The validation entity 102 may store reference heath values, such as the reference health value 108, in the server 114. The validation entity 102 may generate multiple reference health values for a plurality of reference computing devices, in which each reference computing device has a unique hardware and operating system configuration. In some instances, the validation entity 102 may combine a first reference health value that is generated from configuration values associated with hardware platform with a second reference health value that is generated from configuration values associated with an operating system to produce a combined reference health value. In various embodiments, the validation entity 102 may use one or more arithmetic operations and/or one or more data transformation operations to produce the combined reference health value. In this way, the validation entity 102 may produce a multitude of reference health values for computing devices that are distributed by multiple vendors. In the same manner, the validation entity 102 may also generate reference values for different versions of a particular computing device. For example, the validation entity 102 may generate a reference health value for a reference computing device with an original version of an operating system, and another reference health value for the same reference computing device that is equipped with an updated version of the operating system. The validation entity 102 may distribute the reference health values to user computing devices, such as the user computing device 104.

Figure 3:
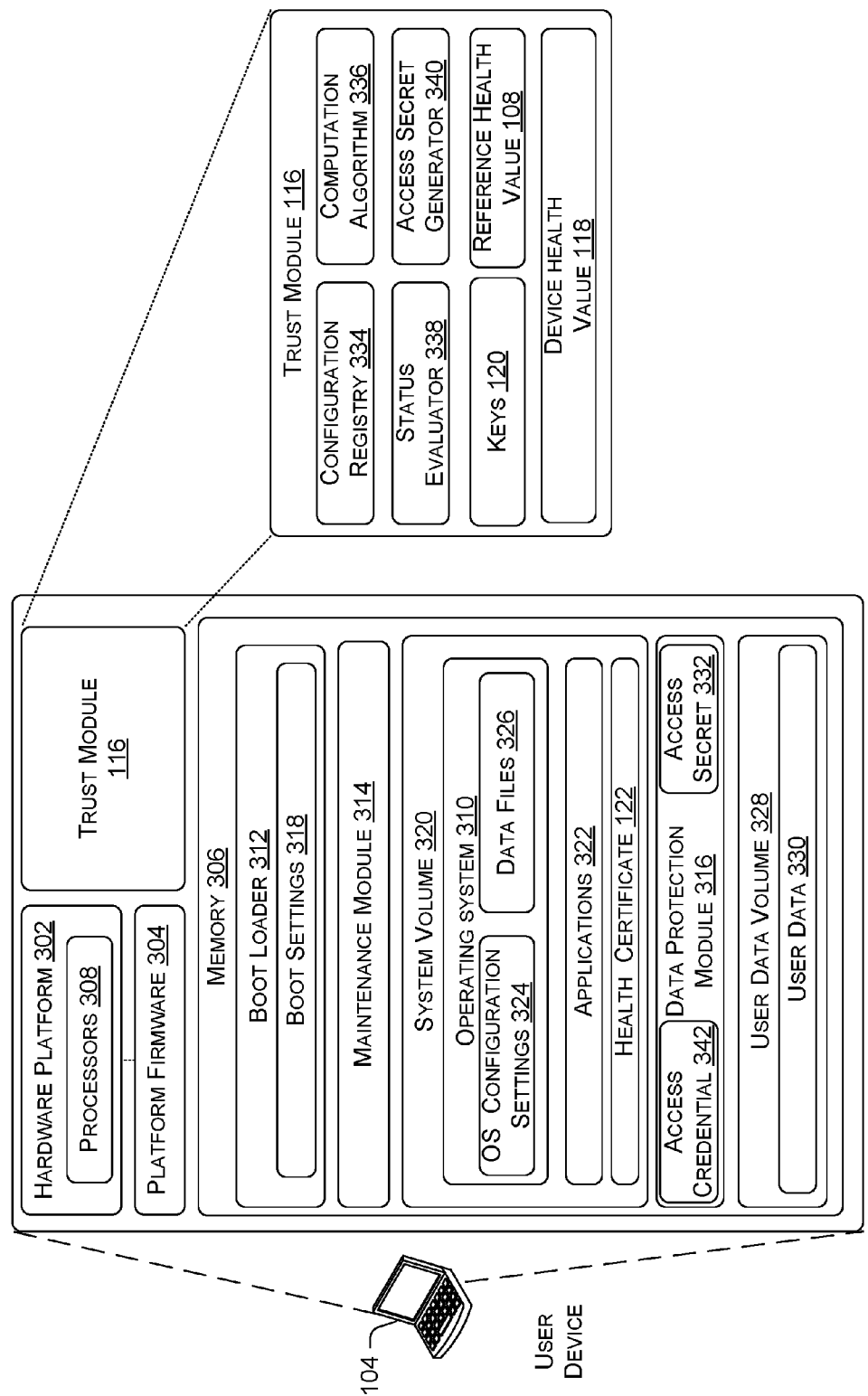
FIG. 3 is an illustrative diagram that shows example components of a user computing device having a trust module that assesses the health status of the user computing device based at least in part on a comparison of a device health value to a stored reference health value.

FIG. 3 is an illustrative diagram that shows example components of the user computing device 104. The user computing device 104 includes the trust module 116 that assesses the health status of the user computing device 104 based on a comparison of a device health value of the computing device to a stored reference health value. In various embodiments, the user computing device 104 may be a desktop computer, a tablet computer, a laptop computer, a smart phone, a game console, a personal digital assistant (PDA), and so forth.

The user computing device 104 may include a hardware platform 302, platform firmware 304, memory 306, and the trust module 116. The hardware platform 302 may include one or more hardware components that enable the software on the user computing device 104 to execute, such as the one or more processor 308. The one or more processors 308 may include a central processing unit (CPU), a graphics processing unit (GPU), a microprocessor, a digital signal processor, and so on. Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. The described functions may be implemented as one or more hardware logic components, such as Field-Programmable Gate Arrays (FPGAs), Application-Specific Integrated Circuits (ASICs), Program-Specific Standard Products (AS-SPs), System-on-a-chip systems (SOCs), Complex Programmable Logic Devices (CPLDs), etc.

Other hardware components of the hardware platform may include a network interface card (NIC), a graphics processing unit (GPU), a sound card, a camera, a display interface, a display, user interfaces, and so forth. Although shown separately for illustrative purposes, the memory 306 may be a part of the hardware platform 302. The user interfaces of the user computing device 104 may include, but are not limited to, combinations of one or more of keypads, keyboards, mouse devices, touch screens that accept gestures, microphones, voice or speech recognition devices, and any other suitable devices or other electronic/software selection methods.

The platform firmware 304 may include program instructions that enable an operating system 310 to interface with the hardware components of the hardware platform 302. Accordingly, the operating system 310 may instruct the hardware components to perform tasks and/or generate data. The firmware for a hardware component may be stored in persistent memory of the hardware component.

The memory 306 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 306 of the user computing device 104 may store software components that include an operating system 310, a boot loader 312, a maintenance module 314, and a data protection module 316. The boot loader 312 may initialize the one or more hardware components of the hardware platform 302. In various embodiments, the boot loader 312 may perform such initialization by executing the firmware that is associated with each hardware component. In some embodiments, the boot loader 312 may initialize the hardware platform 202 using boot settings 318. In various embodiments, the boot settings 318 may dictate the specific hardware components of the hardware platform 302 that are to be initialized at boot up. For example, the boot settings 318 may dictate a specific list of approved hardware components to power up.

Alternatively, the boot settings 318 may dictate one or more criteria for selecting hardware components to be initialized. For example, the boot settings 318 may restrict initialization to each hardware component of the hardware platform 202 whose firmware is approved, e.g., digitally signed, by the validation entity 102. The boot settings 318 may also include specific configurations for initializing the hardware components of the hardware platform 202. For example, the configurations may dictate power levels, data transfer rates, memory allocations, and so forth, for the hardware components. The specific configurations may be configurations that are approved by the validation entity 102.

The user computing device 104 may store the operating system 310 in the system volume 320 of the memory 306. Once the hardware components are initialized, the boot loader 312 may load the operating system 310 into working memory (e.g., RAM) to instantiate a computing environment. The computing environment may support the execution of one or more applications 322. In some embodiments, the boot loader 312 may load the operating system 310 according to the operating system configuration settings 324. The operating system configuration settings 324 may dictate one or more data files 326 (e.g., libraries, drivers, configurations, etc.) of the operating system 310 to be loaded. The loading of the one or more data files 326 may customize the operating system 310 to perform particular services, provide specific functions, or display customized visual effects.

In some embodiments, the hardware platform 302 may be identical to the hardware platform 202, and the operating system 310 may be identical to the operating system 214. Further, the boot settings 318 may be identical to the boot settings 218, and the operating system configuration settings 324 may be identical to the operating system configuration settings 220.

The user data volume 328 may store user data 330. The user data 330 may include data that is generated on behalf of a user, such as the user 128. For example, the user data 330 may include documents that are drafted by a user using an application installed on the user computing device 104, photographs that are saved to the memory 306 by the user, and so forth. The user data 330 may be protected by the data protection module 316. In some embodiments, the user data 330 may be encrypted or password protected using an access secret 332.

The trust module 116 may collect configuration values from the hardware platform 302 and/or the operating system 310 as the user computing device 104 boots up. The trust module 116 may be a standalone processor module that is installed on the user computing device 104. For example, the processor module may be similar to a TPM module that conforms to the TPM specifications outline by the TCG. The trust module 116 may have protection mechanisms, e.g., encryption algorithms, which protect the data that are stored on the trust module 116 from intrusion. In various embodiments, the trust module 116 may operate in a similar manner as the health value module 208 of the reference computing device 110. As such, the trust module 116 may collect the configuration values from the hardware platform 302 and/or the operating system 310 in the same manner as the health value module 208. The trust module 116 may store the configuration values in the configuration registry 334. In some instances, the stored configuration values may exclude configuration values associated with peripheral hardware components (e.g., external keyboard, mouse, docking station, etc.).

Subsequently, the trust module 116 may also generate the device health value 118 in the same manner as the health value module 208 based on the configuration values obtained from the hardware platform 302 and/or the operating system 310. The computation algorithm 336 residing in the trust module 116 may generate the device health value 118. However, in some embodiments, the reference health value 108 and the device health value 118 may be generated solely from configuration values associated with the hardware platforms or the operating systems. Alternatively, the trust module 116 may generate multiple device health values, such as generating a first device health value from the configuration values associated with the hardware platform 302, and generating a second device health value from the configuration values associated with the operating system 310. For example, health values obtained in such manners may be useful in determining health status in scenarios in which different operating systems are implemented on an identical hardware platform, or vice versa.

The status evaluator 338 may compare the device health value 118 to the reference health value 108 to determine whether the user computing device 104 is in a secured state or an unexpected state. In various embodiments, the status evaluator 338 may be a boot process component, such as a component of the boot loader 312. Alternatively, the status evaluator 338 may be a software component that is embedded in the trust module 116. The trust module 116 may receive the reference health values from the server 114 maintained by the validation entity 102. In turn, the trust module 116 may provide the reference health values to the status evaluator 338. Alternatively, the status evaluator 338 may receive the reference health values directly from the servers 114. In various embodiments, the status evaluator 338 may determine that the user computing device 104 is in a secured state when the device health value 118 matches the reference health value 108. Conversely, the status evaluator 338 may determine that the user computing device 104 is in an unexpected state when the device health value 118 and the reference health value 108 are different. Alternatively, in instances in which there are multiple reference health values and multiple device health values, the status evaluator 338 may determine that the user computing device 104 is in a secured state when each device health value is the same as a corresponding reference health value. Otherwise, the status evaluator 338 may determine that the user computing device 104 is in an unexpected state.

In various embodiments, the trust module 116 may bind the one or more keys 120 to the one or more reference health values. Accordingly, the reference health values may be accessible as long as each device health value of the user computing device 104 matches its corresponding reference health value. Accordingly, the status evaluator 338 may check whether the one or more device health values match the one or more reference health values by attempting to access the keys 120 that are stored in the trust module 116. If the keys 120 are accessible, then the status evaluator 338 may determine that the values match. However, if the status evaluator 338 is unable to access the keys 120, then the status evaluator 338 may determine that each of the device health value does not match a corresponding reference health value. However, in other embodiments, the status evaluator 338 may directly compare the one or more device health values to the one or more reference health values.

In the event that the user computing device 104 is found to be in an unexpected state, the status evaluator 338 may halt the execution of the operating system 310 so as to block the user 128 from accessing the computing environment provided by the operating system 310. Additionally, the status evaluator 310 may execute a recover environment that includes the maintenance module 314. In various embodiments, the recovery environment may be provided by a parallel safe software stack that is executed by the one or more processors 308. In the recovery environment, the maintenance module 314 may perform a fix of the software components on the computing device. For example, the maintenance module 314 may display a notification on a display of the user computing device 104 that prompts a user to initiate a fix. The fix may include a repair of a corrupt data file, a removal of malware or virus, a reimaging of the operating system, an installation of new firmware for one or more hardware components, and so forth, such that the user computing device 104 may be brought back into a secured state. Any fix performed with respect to the operating system 310 and the application 322 may be directed to the system volume 320. In various embodiments, the maintenance module 314 may make use various maintenance applications to perform the fix. Such maintenance applications may include disk scanning applications, malware scanning applications, virus scanning applications, firmware flashing applications, re-imagining applications, and so forth. The maintenance applications may be loaded on the user computing device 104 and/or available from the server 114 of the validation entity 102.

For example, the maintenance module 314 may establish a communication link with the server 114 of the validation entity 102 via the network 112. Accordingly, maintenance applications on the server 114 may use the communication link to establish a maintenance session. During the maintenance session, one or more maintenance application may scan the user computing device 104 to detect and fix errors. In some instances, the fix may involve replacing data files on the user computing device 104, such as the operating system 310, the data files 326, the applications 322, and/or the platform firmware 304 with new data files that are stored on the server 114. Since the user data 330 is stored separately in the user data volume 328, the user data 330 is unaffected by any fix of the system volume 320 by the maintenance module 314. This means that access to the user data 330 may be restored following a successful fix of the applications and/or data in the system volume 320. In contrast, if the trust module 116 determines that the user computing device 104 is operating in a secured state, the trust module 116 may permit the user computing device 104 to function normally and execute the applications 322.

In some embodiments, the user computing device 104 may receive one or more keys 120 from the validation entity 102 along with the reference health value 108. The one or more keys 120 may be unique keys that are produced specifically for the user computing device 104. However, in other instances, the one or more keys 120 may be keys that are assigned to multiple identical user computing devices. The trust module 116 may pass the one or more keys 120 to the data protection module 316. In turn, the data protection module 316 may use the one or more keys 120 to protect the user data 330 stored in the user data volume 328. In at least one embodiment, the trust module 116 may use an access secret generator 340 to generate the access secret 332 from a combination of the one or more keys 120 and the reference health value 108. The generation may involve performing arithmetic and/or hashing operations on the one or more keys 120 and the reference health value 108. The trust module 116 may provide the access secret 332 to the data protection module 316. In turn, the data protection module 316 may encrypt the user data 330 using the access secret 332.

Subsequently, applications that desire to access the user data 330 may provide an access credential 342 to the data protection module 316. An application may generate the access credential 342 based on the one or more keys 120 and the device health value 118 using an identical technique that produced the access secret 332. Accordingly, the data protection module 316 may provide the application access to the user data 330 if the access credential 342 may be used by the data protection module 316 to decrypt the user data 330. Otherwise, the data protection module 316 may deny the application access to the user data 330. In alternative embodiments, rather than using the access secret 332 to encrypt the user data 330, the data protection module 316 may use the access secret 332 as a password to protect the user data volume 328.

In other embodiments, the user computing device 104 may receive a health certificate 122 from the validation entity 102 along with the reference health value 108. In some implementations, the health certificate 122 may encapsulate the one or more keys 120 that uniquely identify the user computing device 104. This means that the health certificate 122 is readily identifiable as assigned specifically to the user computing device 104. The health certificate 122 may be used by the user computing device 104 to certify to other devices that the user computing device 104 is in a secured stated, such that the user computing device 104 may obtain services. For example, the user computing device 104 may use the health certificate 122 to negotiate a secured communication channel with another device in order to exchange sensitive information. In another example, the user computing device 104 may use the health certificate 122 to secure permission to complete a purchase transaction. In some embodiments, a service provider that receives the health certificate 122 may send it to a validation entity, such as the validation entity 102. In turn, the validation entity may return an indication as to the validity of the health certificate 122. In other embodiments, the user computing device 104 that desires to obtain a service from the service provider 106 may initially send the health certificate 122 to a validation entity, such as the validation entity 102. If the validation entity 102 determines that the health certificate 122 is valid, e.g., not expired, the validation entity may issue an authentication ticket to the user computing device 104. Subsequently, the user computing device 104 may use the authentication ticket to obtain service from the service provider 106.

In some embodiments, the one or more keys 120 may have expiration dates. The expiration dates may be used to incentivize the user 128 to keep the user computing device 104 up-to-date and secured against the latest security threats. For example, data files that are protected using the one or more keys 120 may become inaccessible following the expiration of the one or more keys 120. The update of the one or more keys 120 to new keys may be made contingent upon the user computing device 104 accepting the software updates 126 from the validation entity 102. For instance, the software updates 126 and the update to the one or more keys 120 may be distributed as a single data package. The software updates 126 may include updates to an operating system, updates to firmware of the hardware platform, updates to one or more applications installed on the user computing device 104, a replacement health certificate for the health certificate 122, and so forth. The superseded keys and/or health certificate may be marked as invalid by the validation entity 102.

In other embodiments, the validation entity 102 may automatically send a new reference health value 108 to the user computing device 104. The new reference health value 108 may be generated following updates to the firmware and/or operating system files on the reference computing device 110. Accordingly, one or more functions of the user computing device 104 may become inaccessible due to a mismatch between the reference health value 108 and the device health value 118. The user 128 may regain access to such functions by downloading the software updates 126 to the user computing device 104.

However, in still other embodiments, the validation entity 102 may automatically provide the software updates 126 to the user computing device 104. The software updates 126 may be provided on a periodic basis and/or at times that are determined by the validation entity 102. The user 128 may opt for such automatic update using an application setting of the maintenance module 314. In this way, the user 128 may be assured that the security state of the user computing device 104 is up to date and that data stored on the user computing device 104 are protected.

Example Processes

FIGS. 4-8 describe various example processes for using a device health value that is derived by a trust module on a computing device to determine the health status of the computing device. The order in which the operations are described in each example process is not intended to be construed as a limitation, and any number of the described operations may be combined in any order and/or in parallel to implement each process. Moreover, the operations in each of the FIGS. 4-8 may be implemented in hardware, software, and/or a combination thereof. In the context of software, the operations may represent computer-executable instructions that, when executed by one or more processors, cause one or more processors to perform the recited operations. The one or more processors may be included in individual computing devices or included in multiple computing devices that are, for example, part of a cloud. Generally, computer-executable instructions include routines, programs, objects, components, data structures, and so forth that cause the particular functions to be performed or particular abstract data types to be implemented. In other embodiments, the operations of each example process may be executed by a hardware logic circuit, such as a dedicated integrated circuit.

Figure 4:
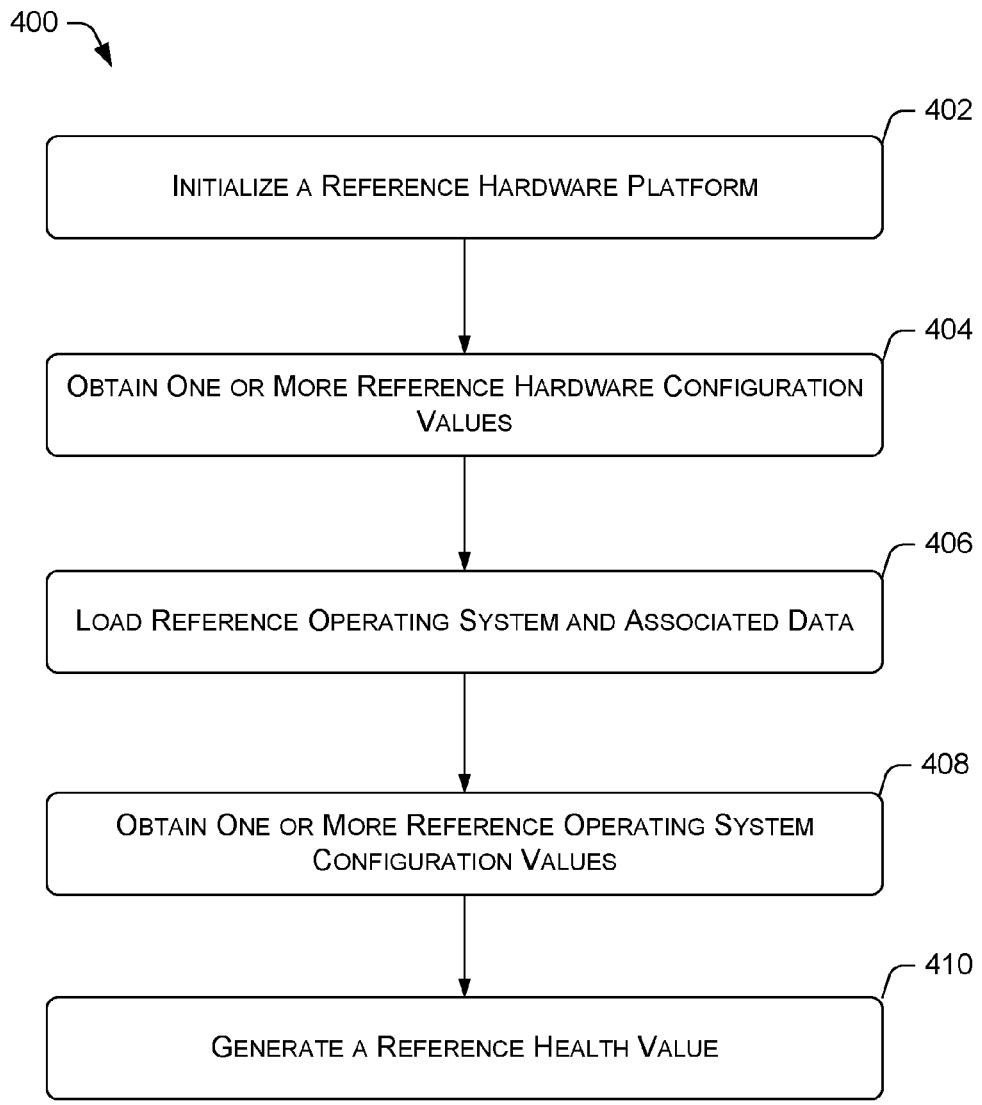
FIG. 4 is a flow diagram that illustrates an example process for generating a reference health value using one or more reference computing devices.

FIG. 4 is a flow diagram that illustrates an example process 400 for generating a reference health value using one or more reference computing devices. At block 402, the boot loader 216 of the reference computing device 110 may initialize a reference hardware platform, such as the hardware platform 202. In various embodiments, the boot loader 216 may perform such initialization by powering up each hardware component and/or providing instructions to each hardware component through the firmware that is associated with each hardware component. In some embodiments, the boot loader 216 may initialize the hardware platform 202 using boot settings 218.

At block 404, health value module 208 of the reference computing device 110 may obtain one or more reference hardware configuration values. The one or more reference hardware configuration values may represent a state of the reference hardware platform 202 as initialized. In various embodiments, an application interface of the hardware platform 202 may interface with the health value module 208 to transfer the one or more reference hardware configuration values to the health value module 208.

At block 406, the boot loader 216 may load a reference operating system, such as the operating system 214. In some embodiments, the boot loader 216 may load the operating system 214 according to the operating system configuration settings 220. The operating system configuration settings 220 may dictate one or more data files 222 (e.g., libraries, drivers, configurations, etc.) of the operating system 214 to be loaded.

At block 408, the health value module 208 may obtain one or more reference operating system configuration values. The one or more operating system configuration values may represent a state of the software stack that includes the operating system as loaded. In various embodiments, an application interface of the operating system 214 may interface with the health value module 208 to transfer the one or more reference operating system configuration values to the health value module 208.

At block 410, the health value module 208 may generate the reference health value 108 from the one or more reference hardware configuration values and/or the one or more reference operating system configuration values. In various embodiments, the health value module 208 may use one or more arithmetic operations and/or one or more data transformation operations to perform the generation, as long as the resultant reference health value 108 uniquely represents the combination of the input configuration values.

However, in other embodiments, multiple reference values may be generated by the health value module 208. For example, the health value module 208 may generate a first reference health value from the configuration values associated with the hardware platform 202, and generating a second device health value from the configuration values associated with the operating system 214. In some instances, the hardware platform 202 and a software stack that includes the operating system 214 may reside on two different reference computing devices. Accordingly, the validation entity 102 may send multiple reference health values to a user computing device, such as the user computing device 104. Alternatively, the validation entity 102 may combine the first and second reference health values into a combined reference health value for delivery to the user computing device 104.

Figure 5:
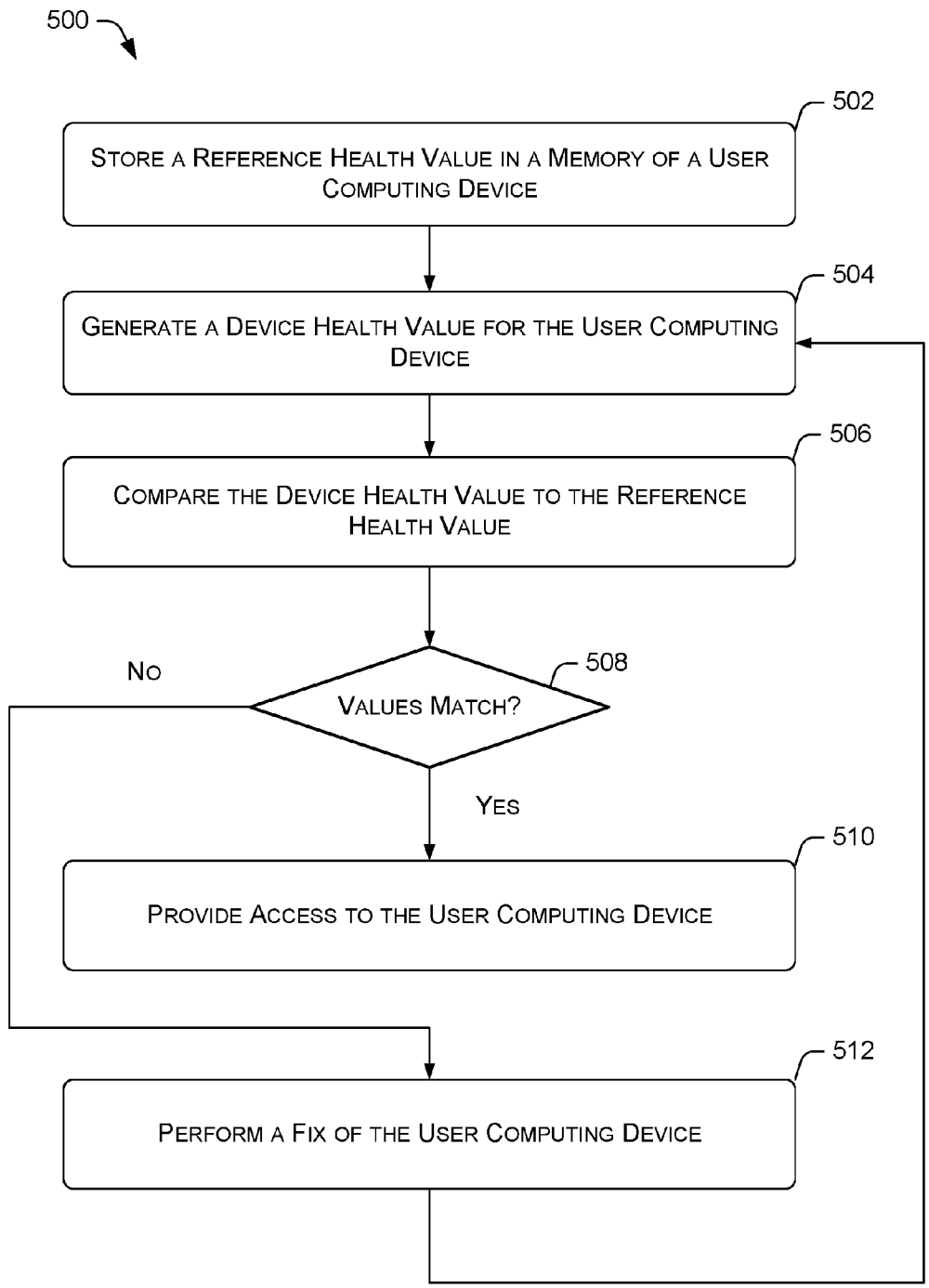
FIG. 5 is a flow diagram that illustrates an example process for determining a health status of a user computing device based on a comparison of a device health value of the user computing device with a reference health value.

FIG. 5 is a flow diagram that illustrates an example process 500 for determining a health status of a user computing device based on a comparison of a device health value of the user computing device with a reference health value. At block 502, the trust module 116 on the user computing device 104 may store a reference health value, such as the reference health value 108. The trust module 116 may receive the reference health value 108 from the server 114 of the validation entity 102. The reference health value 108 may be generated using the reference computing device 110 and correspond to a secured device state.

At block 504, the trust module 116 may generate a device health value, such as the device health value 118, for the user computing device 104. In various embodiments, the device health value 118 may be generated based on a state of the hardware platform 302 and/or a state of a software stack that includes the operating system 310 at boot up. The device health value 118 may represent a health status of the user computing device 104.

At decision block 506, the status evaluator 338 may compare the device health value 118 and the reference health value 108. Thus, if the device health value 118 matches the reference health value 108 ("yes" at decision block 506), the process 500 may proceed to block 510. At block 510, the status evaluator 338 may determine that the user device is in a secured state. Based on this determination, the status evaluator 338 may permit the user computing device 104 to function normally. For example, the user computing device 104 may execute a multitude of applications in the computing environment provided by the operating system 310.

However, if the status evaluator 338 determines that the device health value 118 does not match the reference health value 108 ("no" at decision block 506), the process 500 may proceed to block 512. At block 512, the status evaluator 338 may determine that the user computing device 104 is in an unexpected state. As such, the status evaluator 338 may halt the execution of the operating system 312 so as to block the user 128 from accessing the computing environment provided by the operating system 312. Additionally, the status evaluator 338 may execute a recovery environment that includes the maintenance module 314. In the recovery environment, the maintenance module 314 may perform a fix of the software components on the computing device. The fix may include a repair of a corrupt data file, a removal of malware or virus, a reimaging of the operating system, an installation of new firmware for one or more hardware components, and so forth. The reimaging and/or the installation of new firmware may be accomplished using data files downloaded from the validation entity 102. The fix may bring the user computing device 104 back into the secured state. Subsequent to the fix, the process 500 may loop back to block 504.

Figure 6:
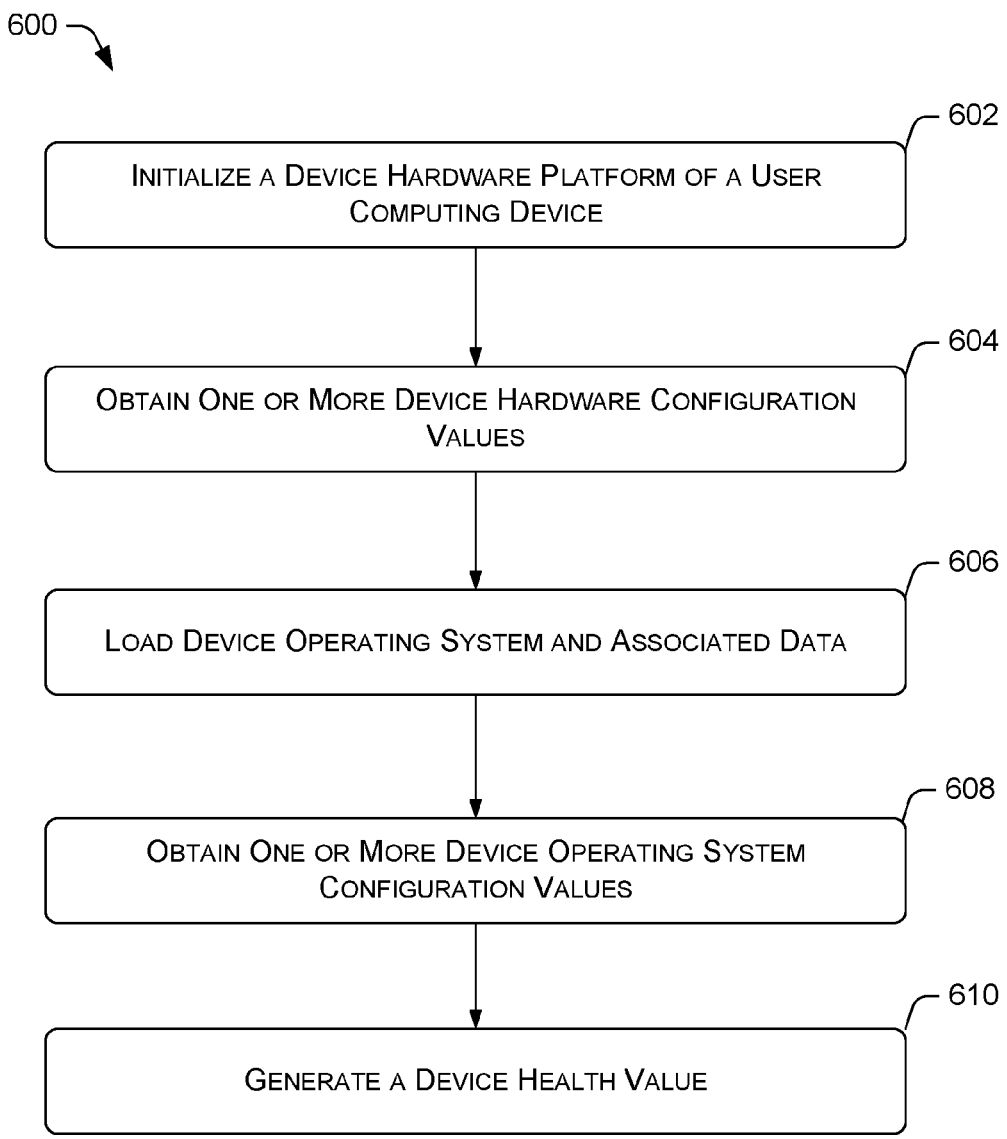
FIG. 6 is a flow diagram that illustrates an example process for generating a device health value for a user computing device.

FIG. 6 is a flow diagram that illustrates an example process 600 for generating a device health value for a computing device. The example process 600 further illustrates block 504 of the process 500. At block 602, the boot loader 312 of the user computing device 104 may initialize a device hardware platform, such as the hardware platform 302. In various embodiments, the boot loader 216 may perform such initialization by powering up each hardware component and/or providing instructions to each hardware component through the firmware that is associated with each hardware component. In some embodiments, the boot loader 312 may initialize the hardware platform 302 using boot settings 318.

At block 604, trust module 116 of the user computing device 104 may obtain one or more device hardware configuration values. The one or more device hardware configuration values may represent a state of the device hardware platform 302 as initialized. In various embodiments, an application interface of the hardware platform 302 may interface with the trust module 116 to transfer the one or more device hardware configuration values to the trust module 116.

At block 606, the boot loader 312 may load device operating system, such as the operating system 310. In some embodiments, the boot loader 312 may load the operating system 310 according to the operating system configuration settings 324. The operating system configuration settings 324 may dictate one or more data files 326 (e.g., libraries, drivers, configurations, etc.) of the operating system 310 to be loaded.

At block 608, the boot loader 312 may obtain one or more device operating system configuration values. The one or more device operating system configuration values may represent a state of a software stack that includes the operating system as loaded. In various embodiments, an application interface of the operating system 310 may interface with the trust module 116 to transfer the one or more device operating system configuration values to the trust module 116.

At block 610, the trust module 116 may generate the device health value 118 from the one or more device hardware configuration values and/or the one or more device operating system configuration values. In various embodiments, the health value module 208 may use one or more arithmetic operations and/or one or more data transformation operations to perform the generation, as long as the resultant device health value 118 uniquely represents the combination of the input configuration values.

Figure 7:
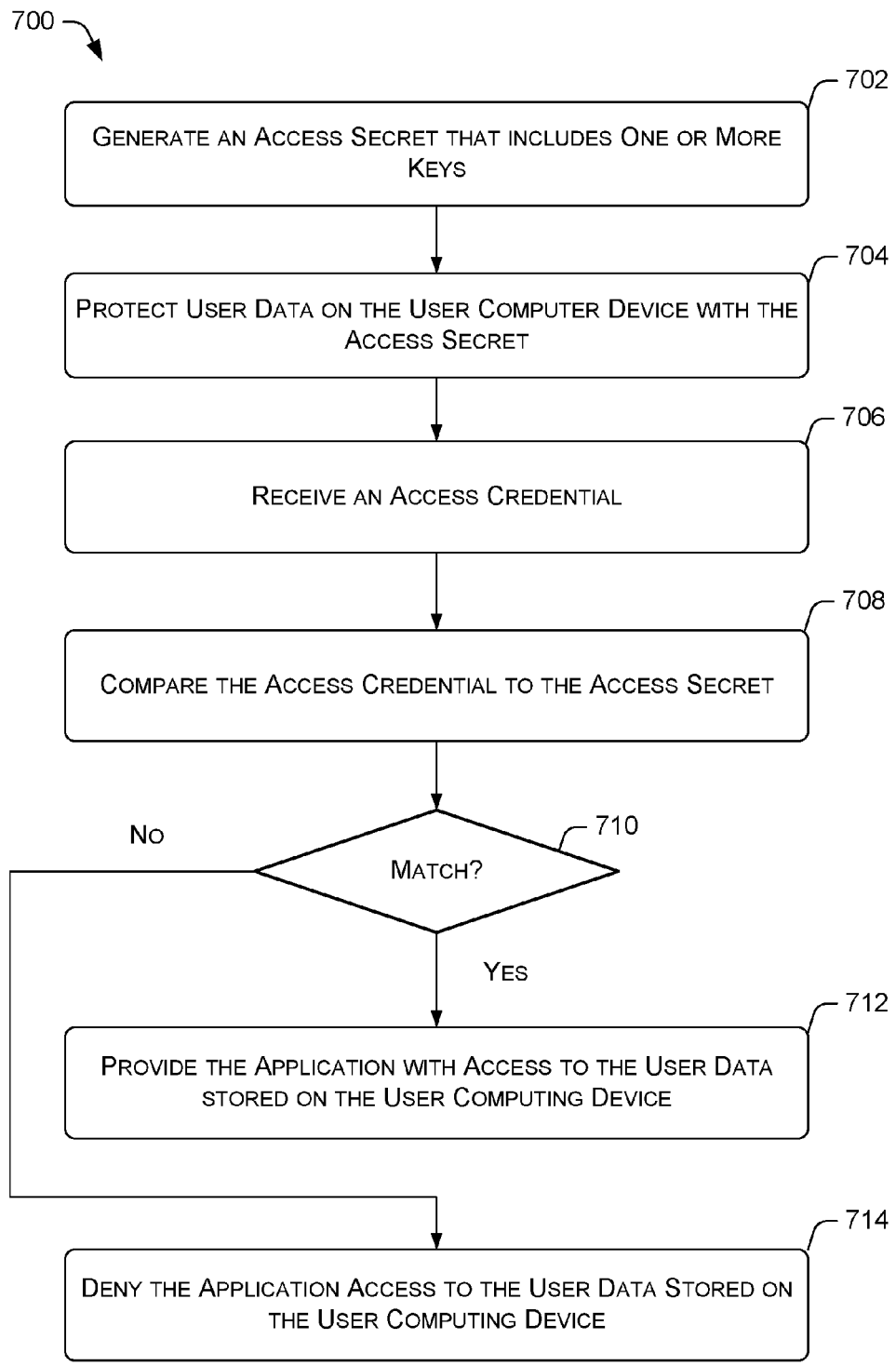
FIG. 7 is a flow diagram that illustrates an example process for using one or more keys and the reference health value to secure user data that is stored on a user computing device.

FIG. 7 is a flow diagram that illustrates an example process for using one or more keys and the reference health value to secure user data that is stored on a user computing device. At block 702, the data protection module 316 on the user computing device 104 may generate the access secret 332 based on the one or more keys 120 and the reference health value 108 received from the validation entity 102. The generation of the access secret 332 may involve performing arithmetic and/or hashing operations on the one or more keys 120 and the reference health value 108.

At block 704, the data protection module 316 may use the access secret 332 to password protect and/or encrypt the user data 330 stored in the user data volume 328. The user data 330 may include data that is generated on behalf of a user. For example, the user data 330 may include documents that are drafted by a user using an application installed on the user computing device 104, photographs that are saved to the memory 306 by the user, and so forth.

At block 706, the data protection module 316 may receive the access credential 342 from an application, such as one of the applications 322. The access credential 342 may be generated based on the one or more keys 120 and the device health value 118. In various embodiments, the application may generate the access credential 342 based on the one or more keys 120 and the device health value 118 using an identical technique that produced the access secret 332. At block 708, the data protection module 316 may compare the access credential 342 to the access secret 332.

At decision block 710, the data protection module 316 may determine whether the access credential 342 matches to the access secret 332. Thus, if the data protection module 316 determines that the access credential 342 matches to the access secret 332 ("yes" at decision block 710), the process 700 may proceed to block 712.

At block 712, the data protection module 316 may provide the application with access to the user data 330 that are stored on the user computing device 104. For example, the data protection module 316 may decrypt the user data 330 in order to provide a requested portion of the user data 330 to the application.

However, if the data protection module 316 determines that the access credential 342 do not match to the access secret 332 ("no" at decision block 710), the process 700 may proceed to block 714. At block 714, the data protection module 316 may deny the application access to the user data 330 stored on the user computing device 104.

Figure 8:
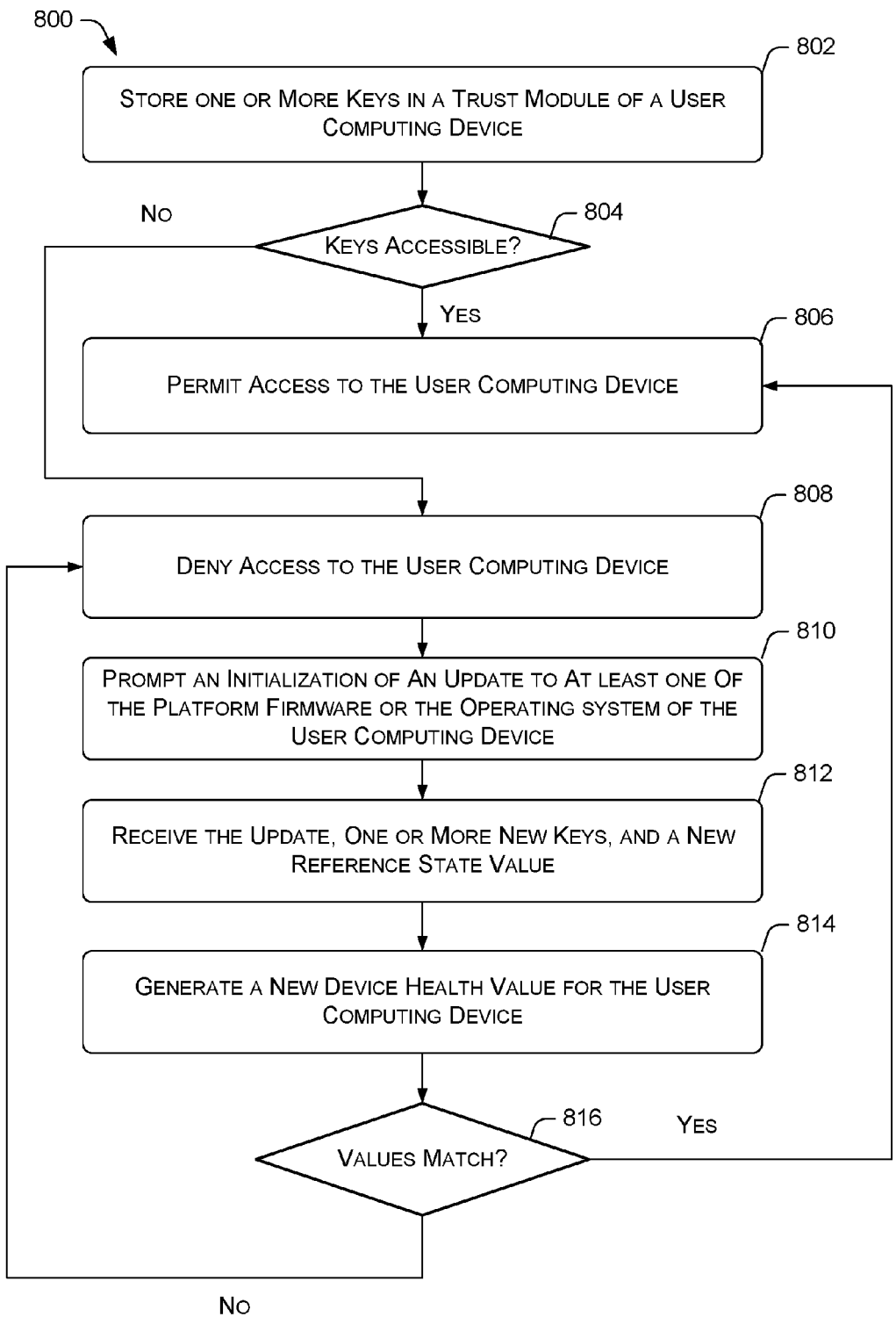
FIG. 8 is a flow diagram that illustrates an example process for using one or more keys that are associated with a reference health value to mandate updates to the operating system of a user computing device.

FIG. 8 is a flow diagram that illustrates an example process 800 for using one or more keys that are associated with a reference health value to mandate updates to the operating system of a user computing device. At block 802, the trust module 116 on the user computing device 104 may store the one or more keys 120 that are associated with the reference health value 108. The user computing device 104 may receive such data from the validation entity 102.

At decision block 804, the trust module 116 may determine whether the one or more keys 120 are accessible, e.g., not expired. The trust module 116 may make such a determination prior to generating the device health value and/or periodically during the operation of the computing device 104. Accordingly, if the trust module 116 determines that the one or more keys 120 are accessible ("yes" at decision block 804), the process 800 may continue to block 806. At block 806, the trust module 116 may permit access to the user computing device 104. For example, the user computing device 104 may be permitted to execute a multitude of applications.

However, if the trust module 116 determines that the one or more keys 120 are not accessible ("no" at decision block 804), the process 800 may continue to block 808. At block 808, the trust module 116 may deny access to the user computing device 104. For example, the trust module 116 may send an indication to the boot loader 312. In response to the indication, the boot loader 312 may activate the recovery environment, and if appropriate, the execution of the operating system 310 may also be halted based on the indication.

At block 810, the maintenance module 314 may prompt the user 128 of the user computing device 104 to initiate an update of the user computing device 104. The update may include an update to the platform firmware 304 and/or an update to the operating system 310. In various embodiments, the maintenance module 314 may prompt the user 128 with a notification that is presented on a display of the user computing device 104.

At block 812, the maintenance module 314 may receive the update, one or more new keys, and a new reference health value in response to the initialization of the update. In various embodiments, the maintenance module 314 may initialize the update and other content after obtaining an affirmative authorization from the user 128. The user 128 may provide the affirmative authorization using the user interface of the user computing device 104.

At block 814, the trust module 116 may generate a new device health value for the user computing device 104 based on a state of a hardware platform and/or a state of the operating system 310 at boot up. In various embodiments, the new device health value is generated based on configuration values related to the state of a hardware platform and/or the state of the operating system 310.

At decision block 816, the status evaluator 338 may determine whether the new device health value matches the new reference health value. Thus, if the status evaluator 338 determines that the new device health value matches the new reference health value ("yes" at decision block 816), the process 800 may loop back to block 806. Upon return to block 806, the status evaluator 338 may permit access to the user computing device 104.

However, if the status evaluator 338 determines that the new device health value does not match the new reference health value ("no" at decision block 816), the process 800 may loop back to block 808. Upon return to block 808, the status evaluator 338 may deny access to the user computing device 104, such that further blocks of the process 800 may be performed.

In summary, the techniques may enable operating system developers to directly manage the configuration of the computing device as a secured computing platform. In this way, the user may be freed from the tasks of monitoring the health of the computing device, ensuring that the latest updates and patches are installed, and verifying that the operating system is free from malware, virus, and other malicious code. Instead, the user may be assured that from the time of booting up, the computing device is in a secured state, and that the user is able to trust the computing device to keep confidential user data secure.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:

1. A device comprising:
   one or more processors;
   one or more computer-readable media;
   a boot loader stored in the one or more computer-readable media and executable by the one or more processors to:
      initiate one or more hardware components of a hardware platform; and
      load an operating system;
   a trust component executable by the one or more processors to generate a device health value associated with at least one of the hardware platform or the operating system; and
   a status evaluator executable by the one or more processors to:
      determine that the device health value does not match a corresponding reference health value received from a validation entity; and
      based at least in part the health value not matching the corresponding reference health value, implementing a recovery environment.

2. A device as recited in claim 1, further comprising a maintenance module stored in the one or more computer-readable media and executable by the one or more processors to perform, based at least in part on implementing the recovery environment, at least one of:
   a repair of a corrupt data file;
   a removal of malware or a virus;
   a reimaging of the operating system;
   an installation of firmware for the one or more hardware components; or
   an update of the operating system.

3. A device as recited in claim 1, further comprising a maintenance module stored in the one or more computer-readable media and executable by the one or more processors to establish, based at least in part on implementing the recovery environment, a communication link with the validation entity in order to detect and fix an error on the device.

4. A device as recited in claim 1, wherein the trust component is further executable by the one or more processors to:
obtain one or more hardware configuration values, the one or more hardware configuration values representing a state of the hardware platform as initialized; and
obtain one or more operating system configuration values, the one or more operating system configuration values representing a state of the operating system as loaded, wherein the trust component is executable by the one or more processors to generate the device health value based at least in part on at least one of the one or more hardware configuration values or the one or more operating system configuration values.

5. A device as recited in claim 1, wherein the trust component is executable by the one or more processors to generate the device health value during at least one of initialization of the hardware platform or loading of the operating system.

6. A method, comprising:
initializing, by an electronic device, one or more hardware components of a hardware platform;
loading, by the electronic device, an operating system;
generating, by the electronic device, a device health value, the device health value associated with at least one of the hardware platform or the operating system;
determining, by the electronic device, that the device health value does not match a reference health value; and
based at least in part on determining that the device health value does not match the reference health value, implementing, by the electronic device, a recovery environment on the electronic device.

7. A method as recited in claim 6, further comprising determining that the electronic device is in an unexpected state based at least in part on determining that the device health value does not match the reference health value.

8. A method as recited in claim 6, further comprising performing, based at least in part on implementing the recovery environment on the electronic device, at least one of:
a repair of a corrupt data file;
a removal of malware or a virus;
a reimaging of the operating system;
an installation of firmware for the one or more hardware components; or
an update of the operating system.

9. A method as recited in claim 6, further comprising establishing, based at least in part on implementing the recovery environment on the electronic device, a communication link with an entity in order to detect and fix an error on the electronic device.

10. A method as recited in claim 6, further comprising denying, based at least in part on implementing the recovery environment on the electronic device, access to data stored on the electronic device.

11. A method as recited in claim 6, further comprising receiving the reference health value from a validation entity.

12. A method as recited in claim 6, further comprising:
obtaining one or more hardware configuration values, the one or more hardware configuration values representing a state of the hardware platform as initialized; and
obtaining one or more operating system configuration values, the one or more operating system configuration values representing a state of the operating system as loaded, wherein generating the device health value comprises generating the device health value based at least in part on at least one of the one or more hardware configuration values or the one or more operating system configuration values.

13. A method as recited in claim 6, wherein generating the device health value comprises generating the device health value during at least one of initialization of the hardware platform or loading of the operating system.

14. A method as recited in claim 6, further comprising:
generating, after implementing the recovery environment, a new device health value, the new device health value associated with at least one of the hardware platform or the operating system;
determining that the new device health value matches the reference health value; and
based at least in part on determining that the new device health value matches the reference health value, providing access to data stored on the electronic device.

15. An electronic device comprising:
one or more processors; and
one or more computer-readable media storing instructions that, when executed by the one or more processors, cause the one or more processors to perform operations comprising:
receiving a reference health value from a validation entity;
generating a device health value associated with at least one of a hardware platform or an operating system;
determining that the device health value does not correspond to the reference health value; and
determining that the electronic device is in an unexpected state.

16. An electronic device as recited in claim 15, the operations further comprising implementing a recovery environment based at least in part on determining that the device health value does not correspond to the reference health value.

17. An electronic device as recited in claim 15, the operations further comprising performing, based at least in part on determining that the device health value does not correspond to the reference health value, at least one of:
a repair of a corrupt data file;
a removal of malware or a virus;
a reimaging of the operating system;
an installation of firmware for one or more hardware components of the hardware platform; or
an update of the operating system.

18. An electronic device as recited in claim 15, the operations further comprising establishing, based at least in part on determining that the device health value does not correspond to the reference health value, a communication link with the validation entity in order to detect and fix an error on the electronic device.

19. An electronic device as claim 15 recites, the operations further comprising:
obtaining one or more hardware configuration values, the one or more hardware configuration values representing a state of the hardware platform; and obtaining one or more operating system configuration values, the one or more operating system configuration values representing a state of the operating system wherein generating the device health value comprises generating the device health value based at least in part on at least one of the one or more hardware configuration values or the one or more operating system configuration values.

20. An electronic device as recited in claim 15, wherein generating the device health value comprises generating the device health value during at least one of initialization of the hardware platform or loading of the operating system.

\* \* \* \* \*